United States Patent
Aizaz et al.

(10) Patent No.: US 9,759,261 B2
(45) Date of Patent: Sep. 12, 2017

(54) METHODS FOR MANUFACTURING HIGH TEMPERATURE BEARING COMPONENTS AND ROLLING ELEMENT BEARINGS

(71) Applicant: HONEYWELL INTERNATIONAL INC., Morris Plains, NJ (US)

(72) Inventors: Amer Aizaz, Phoenix, AZ (US); Derek Anthony Rice, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 79 days.

(21) Appl. No.: 14/944,323

(22) Filed: Nov. 18, 2015

(65) Prior Publication Data
US 2017/0138402 A1    May 18, 2017

(51) Int. Cl.
F16C 33/62    (2006.01)
F16C 33/64    (2006.01)
F16C 19/02    (2006.01)

(52) U.S. Cl.
CPC .............. *F16C 33/64* (2013.01); *F16C 19/02* (2013.01); *F16C 2204/52* (2013.01); *F16C 2220/20* (2013.01); *F16C 2300/54* (2013.01)

(58) Field of Classification Search
CPC ...... F16C 33/62; F16C 33/64; F16C 2206/40; F16C 2206/80; B22F 3/105;
(Continued)

(56) References Cited

U.S. PATENT DOCUMENTS 3,418,026 A * 12/1968 Ericson ................ A47B 88/493
                                                              384/19
3,670,137 A    6/1972 Inoue
(Continued)

FOREIGN PATENT DOCUMENTS

EP    2853611 A2    4/2015
WO    2011057728 A1    5/2011

OTHER PUBLICATIONS

Piascik, J. et al.; Powder Mixtures Containing Uniform Dispersions of Ceramic Particles in Superalloy Particles and Related Methods; U.S. Appl. No. 14/036,373, filed Sep. 25, 2013.
(Continued)

*Primary Examiner* — Phillip A Johnson
(74) *Attorney, Agent, or Firm* — Lorenz & Kopf, LLP

(57) ABSTRACT

High temperature rolling element bearings and methods for manufacturing high temperature bearing components, such as bearing races or rings, are provided. In one embodiment, the method includes obtaining a powder mixture containing a superalloy powder admixed with hard wear particles, such as carbide particles. The powder mixture is consolidated utilizing a spark plasma sintering process during which the powder mixture is compressed into a sintered blank, while an electrical current is conducted through the powder mixture to heat the powder mixture to a sintering temperature. The sintered blank is then machined to impart the bearing component with its final shape. Precipitate hardening may also be performed, if desired. The spark plasma sintering process is controlled to limit the temperature and duration of the powder consolidation process thereby imparting the resulting bearing component with an enhanced hot hardness and other desirable properties at highly elevated operating temperatures.

20 Claims, 2 Drawing Sheets

(58) Field of Classification Search
CPC ... B22F 2003/1051; C21D 6/02; C22C 29/00; C22C 29/06; C22C 29/10; C22C 32/00; C22C 32/0047; C22C 32/0052; C22C 1/023; C22C 1/0433; C22C 19/03

See application file for complete search history.

(56) References Cited

U.S. PATENT DOCUMENTS

| | | | |
|---|---|---|---|
| 3,762,919 | A | 10/1973 | Daniels |
| 4,306,907 | A * | 12/1981 | Ahn ................ C22C 32/0047 148/405 |
| 4,929,415 | A | 5/1990 | Okazaki |
| 5,518,820 | A * | 5/1996 | Averbach ............. F16C 33/30 384/125 |
| 7,354,548 | B2 | 4/2008 | Liu |
| 7,829,013 | B2 | 11/2010 | Eason et al. |
| 7,857,188 | B2 | 12/2010 | Liu |
| 2006/0015187 | A1 * | 1/2006 | Hunter ................. A61L 27/30 623/23.5 |
| 2007/0047857 | A1 | 3/2007 | Hamada et al. |
| 2012/0085585 | A1 * | 4/2012 | Scott ................... B22D 19/14 175/428 |
| 2015/0003997 | A1 | 1/2015 | Mironets et al. |
| 2015/0139582 | A1 * | 5/2015 | Sears .................... F16C 33/64 384/548 |
| 2016/0158839 | A1 * | 6/2016 | Piascik ............... C22C 1/0433 75/352 |

OTHER PUBLICATIONS

Tang C. F. et al; Spark plasma sintering cobalt base superalloy strengthened by Y—Cr—O compound through high-energy milling; Journal of Materials Processing Technology; vol. 204, No. 1-3, Aug. 11, 2008.

Kaplin C. et al; The Effect of Grain Size on the Cyclic Oxidation of NiCoCrAlY; Journal of Metals, Springer New York; vol. 66, No. 6, Apr. 5, 2014.

Extended EP Search Report for Application No. 16196773.2.-1373 dated Apr. 20, 2017.

* cited by examiner

METHODS FOR MANUFACTURING HIGH TEMPERATURE BEARING COMPONENTS AND ROLLING ELEMENT BEARINGS

TECHNICAL FIELD

The present invention relates generally to powder metallurgy and, more particularly, to high temperature rolling element bearings and methods for manufacturing high temperature bearing components, such as bearing races or rings.

BACKGROUND

The thermal tolerances of rolling element bearings are commonly determined by the material temperature limitations of the bearing rings or races. Bearings containing races fabricated from wrought or sintered superalloys may be capable of sustained operation at significantly elevated temperatures exceeding 800° F. (~427° C.) and, in certain instances, approaching 1200° F. (~648° C.). At still higher temperatures, however, the hot hardness and other desired physical properties of the bearing races rapidly diminish. It may be possible to enhance the temperature capabilities of a rolling element bearing by fabricating the bearing races from ceramic materials. Bearing races produced from ceramic materials are, however, relatively brittle and thus prone to fracture when subjected to significant mechanical loading. The propensity of ceramic bearing races to fracture when subject to loading can be particularly problematic when the rolling element bearing is mounted around a shaft fabricated from an alloy having a relatively high coefficient of thermal expansion as compared to bearing and, specifically, as compared to the inner bearing race. Consequently, few if any rolling element bearings presently exist that are capable of providing prolonged, reliable operation when subject to heavy loads at highly elevated temperatures exceeding 1200° F. (~648° C.). While immaterial in the vast majority of applications, such temperature limitations can be unduly restrictive in instances wherein the rolling element bearing is utilized within certain types of high temperature devices, such as gas turbine engine bleed valves.

There thus exists an ongoing demand for rolling element bearings and other bearings capable of sustained, reliable operation at highly elevated temperatures exceeding 1200° F. (~648° C.) and possibly approach or exceeding 1400° F. (~760° C.). More specifically, it would be desirable to provide high temperature bearing races and other bearing components capable of maintaining relatively high hardness levels (e.g., Rockwell hardnesses of C50 or greater) under such highly elevated operating temperatures, while further remaining relatively resistant to wear, fatigue, and fracture in the presence of significant mechanical loading. It would also be desirable to provide efficient, cost-effective methods for manufacturing such high temperature bearing components. Other desirable features and characteristics of embodiments of the present invention will become apparent from the subsequent Detailed Description and the appended Claims, taken in conjunction with the accompanying drawings and the foregoing Background.

BRIEF SUMMARY

Methods for manufacturing high temperature bearing components, such as bearing races or rings, are provided. In one embodiment, the method includes obtaining a powder mixture containing a superalloy powder admixed with hard wear particles, such as titanium carbide particles. The powder mixture is consolidated utilizing a Spark Plasma Sintering (SPS) process during which the powder mixture is compressed into a sintered blank having a near net shape, while an electrical current is conducted through the powder mixture to heat the powder mixture to an elevated sintering temperature. The sintered blank is then ground or otherwise machined to impart the bearing component with its final shape. Precipitate hardening may also be performed before or after machining, if desired. The SPS process is controlled to limit the temperature and duration of the powder consolidation process thereby imparting the resulting bearing component with an enhanced hot hardness and other desirable properties at highly elevated operating temperatures.

In another embodiment, the method includes producing, purchasing, or otherwise obtaining a powder mixture containing a gas atomized, nickel-based superalloy powder admixed with ceramic particles. A pulsed electrical current is passed through the powder mixture to heat the powder mixture to a sintering temperature, while the powder mixture is compressed into an annular sintered blank. The annular sintered blank is then ground or otherwise machined to impart the high temperature bearing component with a final shape, such as a finished ring shape. The high temperature bearing component is further precipitate hardened to increase the hardness of the bearing component at elevated operating temperatures.

High temperature rolling element bearings are further provided. In one embodiment, the high temperature rolling element bearing includes an inner ring, an outer ring concentric with the inner ring, and a plurality of rolling elements captured between the inner ring and the outer ring. At least one of the inner ring and the outer ring is composed of a powder mixture consolidated into a coherent mass utilizing an SPS process carried-out under process conditions creating a superalloy matrix substantially free of intermetallic phases, containing less than 1% porosity by volume, and throughout which hard wear particles are distributed. In certain embodiments, the superalloy matrix may be composed of a nickel-based superalloy containing ceramic particles and, perhaps, containing 25 to 30 percent titanium carbide particles by weight. In further implementations, the ceramic particles may have a mean diameter between 5 and 15 microns.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

The following describes methods for manufacturing bearing races and other bearing components having relatively high hardness levels (e.g., Rockwell hardnesses of C50 or greater) at highly elevated operating temperatures exceeding 1200° F. (~648° C.) and, in certain cases, operating temperatures exceeding 1400° F. (~760° C.). Additionally, the high temperature bearing components may have other desirable physical characteristics at such highly elevated operating temperatures, such as enhanced fatigue resistance, wear resistance, toughness (fracture resistance), and material strength properties. The bearing components are produced from a powder mixture containing superalloy powder admixed with hard wear particles. The powder mixture is consolidated into sintered blank utilizing, for example, a Spark Plasma Sintering (SPS) process. The SPS process is controlled to limit the duration and temperature of the powder consolidation process and thereby reduce or eliminate liquid-phase sintering of the hard wear particles and diffusion of the hard wear particles into the sintered superalloy powder. This results in the production of sintered blanks composed of highly dense superalloy matrices substantially devoid of embrittling intermetallic phases. The sintered blanks can then undergo further processing (e.g., machining and precipitate hardening) to yield bearing components having the desirable high temperature properties described above.

Figure 1:
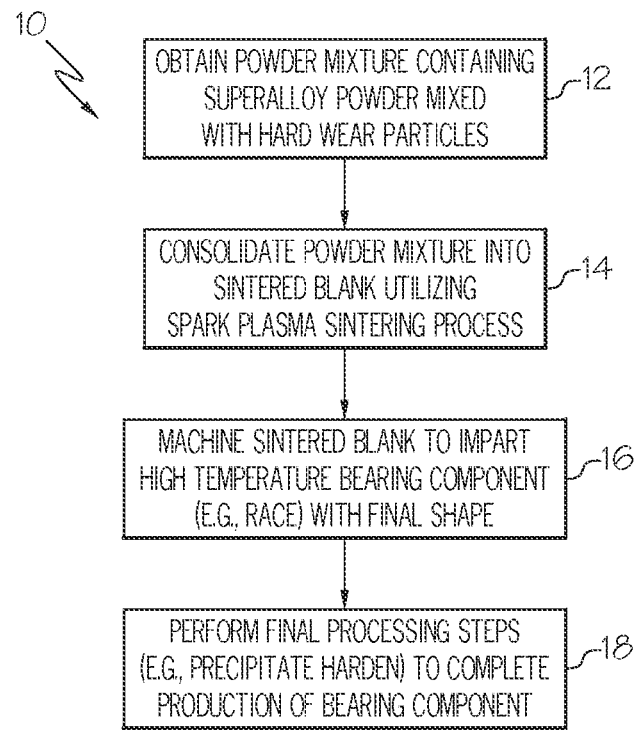
FIG. 1 is a flowchart setting-forth an exemplary embodiment of a method for manufacturing a high temperature bearing component, such as a bearing ring or race, as illustrated in accordance with an exemplary embodiment of the present invention.

FIG. 1 is a flowchart setting-forth an exemplary method 10 for manufacturing a high temperature bearing component, as illustrated in accordance with an exemplary embodiment of the present invention. For purposes of explanation, exemplary method 10 is described below in conjunction with the manufacture of a particular type of high temperature bearing component, namely, the annular race or ring of the ball bearing shown in FIG. 4. It is emphasized, however, that the following description is provided by way of non-limiting example only. In further embodiments, manufacturing method 10 can be utilized to produce other types of high temperature bearing components, such as the tubular body of a bushing or the races of another type of rolling element bearing. Furthermore, the steps shown in FIG. 1 and described in sequence below (STEPS 12, 14, 16, and 18) are provided by way of non-limiting example only. In alternative embodiments of method 10, additional steps may be performed, certain steps may be omitted, and/or the illustrated steps may be performed in alternative sequences. Additionally, each step generically illustrated in FIG. 1 may entail a single process or multiple individual sub-processes.

Exemplary method 10 commences with obtaining a powder mixture (STEP 12, FIG. 1). The powder mixture can be independently produced, purchased from a supplier, or otherwise obtained during STEP 12. The powder mixture contains and, in certain cases, may consist essentially of a superalloy powder admixed with hard wear particles. The term "hard wear particle," as appearing herein, refers to a particle having a hardness greater than the particles of the superalloy powder over the operating temperature range of the high temperature bearing component. A non-exhaustive list of hard wear particles that may be combined with the superalloy powder in the power mixture includes various different ceramic particles including, but not limited to, carbides, borides, nitrides, silicides, and certain oxides, such as aluminum oxide. Titanium carbide (TiC) particles are particularly useful due, at least in part, to their high hardness, favorable oxidation resistance characteristics, excellent wear properties, relatively low densities, and chemical compatibility with certain matrix materials described herein. Additionally, TiC particles are typically readily commercially available at relatively low costs.

In general, the powder mixture obtained during STEP 12 of exemplary method 10 (FIG. 1) may contain 10 to 80 percent hard wear particles by weight percentage (wt %). It will be appreciated, however, that the particular quantity of hard wear particles contained within the power mixture will vary amongst embodiments depending upon, for example, the density of the chosen hard wear particles. For example, in a first embodiment wherein TiC particles are chosen as the hard wear particles, the powder mixture may contain 15 to 35 wt % and, more preferably, 25 to 30 wt % TiC particles. By comparison, in a second embodiment wherein tungsten carbide (WC) particles are selected as the hard wear particles, the powder mixture may contain 60 to 80 wt % WC particles (which are heavier than TiC particles of the same size). As a third example, in an embodiment wherein relatively light aluminum oxide (e.g., $Al_2O_3$) particles are utilized, the powder mixture may contain 10 to 25 wt % aluminum oxide particles. The foregoing examples notwithstanding, the power mixture can contain greater or lesser quantities of hard wear particles (e.g., due to differences in particle density), multiple different types of hard wear particles, and/or other additives in further embodiments. In many cases, the power mixture may be prepared or otherwise selected to contain less than 55 percent hard wear particles by volume (vol %) and, perhaps, between 10 and 55 vol % hard wear particles.

The powder mixture can contain various different types of superalloy powders. In one embodiment, the powder mixture contains a nickel-based superalloy; that is, a superalloy containing nickel as its primary constituent. The nickel-based superalloy may further contain cobalt, tungsten, titanium, aluminum, and lesser amounts of other metallic or non-metallic constituents. The nickel-based superalloy is also usefully selected to have a composition that is substantially free of iron, as this may facilitate the retention of high temperature strength; the term "substantially free of," as appearing herein, defined as containing less than 1 wt % of a named constituent or ingredient. Commercially-available alloys that may meet the foregoing criteria include MAR 247 and HON ALLOY 10. In one specific, albeit non-limiting embodiment, the powder mixture is selected to contain tungsten and cobalt, while being substantially free of iron. In still further embodiments wherein the bearing component and, more generally, the high temperature bearing is installed around a shaft composed of a superalloy having a first Coefficient of Thermal Expansion (CTE), the superalloy powder may be selected to have a second CTE matched to the first CTE; the term "matched" defined herein as a disparity of less than 10%. For example, in certain embodiments, the superalloy powder may be selected to have the same formulation as does the superalloy parent material of the shaft. In this manner, the radial loading of the high temperature bearing component (e.g., the inner ring or race of a rolling element bearing) can be reduced during high temperature operation of the bearing and shaft.

The particular sizes and shapes of the superalloy particles and the hard wear particles can vary among embodiments. In one embodiment, the hard wear particles are sieved or otherwise selected to have a maximum diameter equal to or less than 37 microns (μm) or −315 mesh. By comparison, the superalloy particles can be selected to have a maximum diameter equal to or less than 53 μm or −270 mesh in an embodiment. The superalloy particles can be produced utilizing an inert gas (e.g., argon) atomization process. In one example, the powder mixture is composed of a gas atomized, nickel-based superalloy admixed with titanium carbide particles. The powder mixture can be mixed utilizing a resonant acoustic mixing process, a milling process, or other process capable for ensuring a substantially uniform or even dispersal of the hard wear particles throughout the powder mixture. Generally, selecting the hard wear particles and superalloy particles to minimize disparity in particle size will tend to promote thorough mixing of the particles. Thus, in a further embodiment, the hard wear particles and superalloy particles are selected to have a ratio in average diameter of between 1:1 to 1:16 hard wear particles-to-superalloy particles. After combining the superalloy and hard wear particles, ball milling may be performed to create a uniform mixture having a desired final mean particle size. The final mean particle size can be between 1 and 20 μm and, more preferably, between 5 and 15 μm in an embodiment.

Advancing to STEP 14 of manufacturing method 10 (FIG. 1), the powder mixture is next consolidated into a sintered blank having a near net shape utilizing, for example, an SPS process. During an exemplary SPS process, the powder mixture is loaded into the die of an SPS tool or apparatus. An electrical current is passed through the powder mixture to rapidly heat the powder to a desired sintering temperature. The electrical current can be, for example, a pulsed direct current sufficient to induce rapid resistance heating and possibly sparking within the powder mixture. Additional heating can also be provided by an external heating element, such as an induction heater; however, this is not necessary. In conjunction with rapid heating of the powder, a compressive force is exerted across the powder mixture contained within the die. This combination of rapid, current-driven heating and convergent pressure allows sintering of the powder mixture in relatively short process durations and at temperatures lower than those achievable utilizing other known sintering processes, such as conventional liquid phase sintering processes. For example, in many cases, the SPS process can be completed in relatively abbreviated time periods on the order of several minutes whereas other known sintering process might require several hours to perform. This not only increases manufacturing efficiency, but allows the production of sintered blanks having exceptionally high densities and highly refined microstructures. Specifically, melting and liquid-phase sintering of the hard wear (e.g., TiC) particles is reduced or avoided, which can otherwise result in agglomeration of the particles and weakening of the sintered blank. Similarly, diffusion of the hard wear particles into the superalloy matrix is reduced to minimize the formation of embrittling intermetallic phrases; e.g., in one embodiment, the SPS process is controlled to yield a sintered blank composed of a superalloy matrix substantially free of intermetallic phases and containing less than 1% porosity by volume. As a still further benefit, the rapid, current-induced heating within the powder mixture helps refine the microstructure and may favorably increase the overall toughness of the sintered blank.

Figure 2:
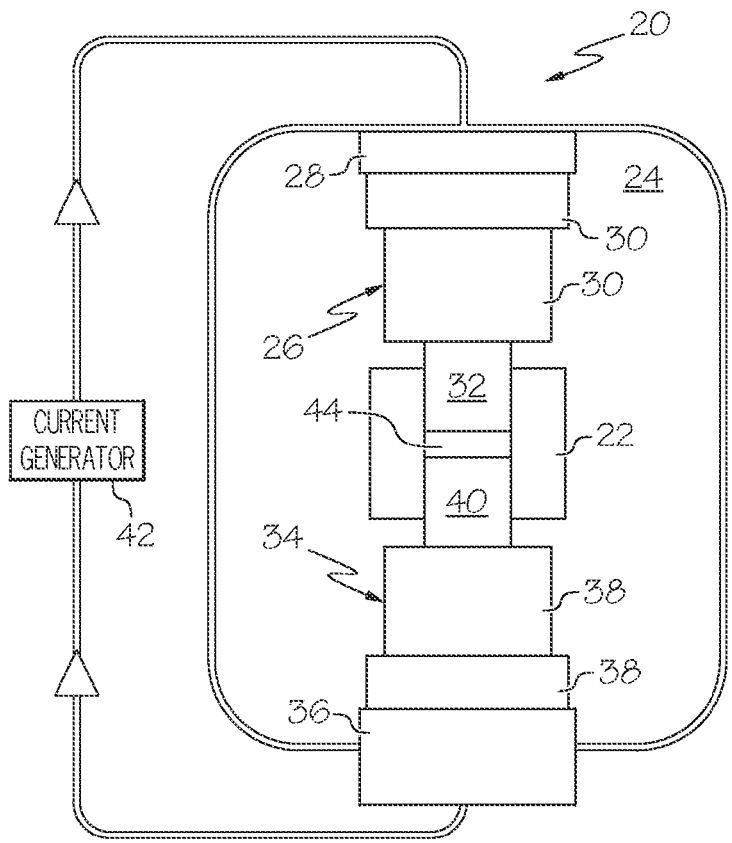
FIG. 2 is a schematic illustrating a spark plasma sintering apparatus suitable for consolidating a superalloy powder mixture into a sintered blank, which is further processed to yield the high temperature bearing component in accordance with an exemplary embodiment of the method illustrated in FIG. 1.

FIG. 2 schematically illustrates an exemplary SPS apparatus 20, which can be utilized to consolidate the powder mixture during STEP 14 of method 10 (FIG. 1). Briefly, SPS apparatus 20 includes a die 22 contained within a process chamber 24. An upper tool part 26 includes an upper electrode 28, a number of spacers 30 (e.g., graphite blocks), and an upper press or punch 32, which is matingly received through a top opening in die 22. Similarly, a lower tool part 34 includes a lower electrode 36, a number of spacers 38, and a lower press or punch 40, which is matingly received through a bottom opening in die 22. A current generator 42 is coupled to upper electrode 28 and lower electrode 36. During the SPS process, process chamber 24 is evacuated or filled with an inert gas, such argon. Current generator 42 is then utilized to apply a pulsed current across upper tool part 26 and lower tool part 34 through the powder mixture loaded into die 22 (identified in FIG. 2 by reference numeral "44"). As the current passes through the powder mixture, the pulsed current rapidly heats the powder mixture (e.g., due to resistance heating and possibly localized sparking) to the desired sintering temperature. Concurrently, upper punch 32 converges toward lower punch 40 whether by linear movement of upper tool part 26, by linear movement of lower tool part 34, or a combination thereof. The combination of pressure and temperature consolidates the powder mixture into a sintered blank having a near net shape encompassing the desired final shape of the high temperature bearing component.

Figure 3:
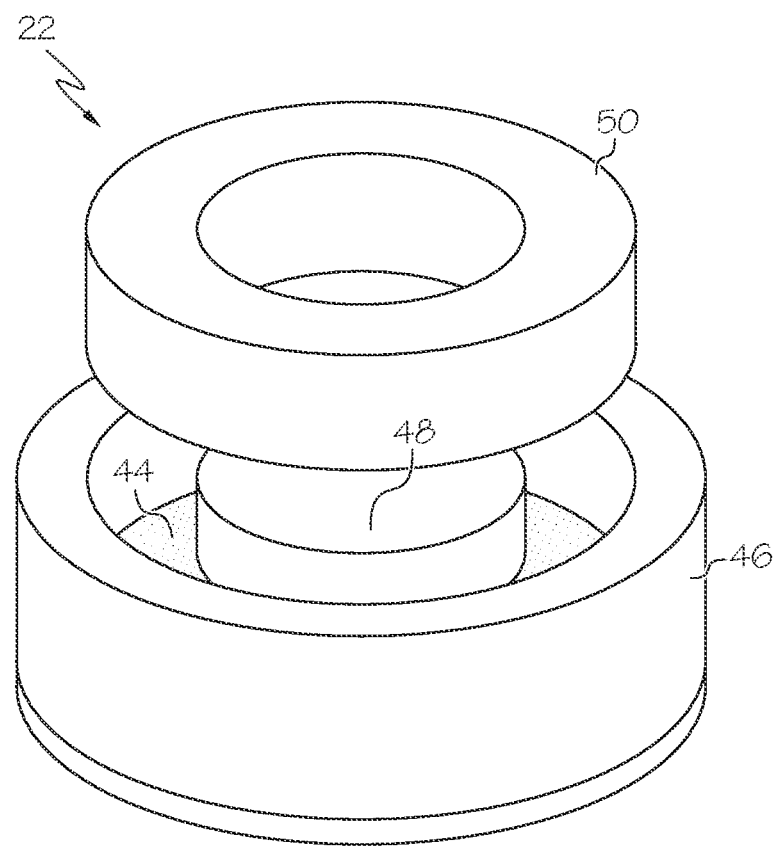
FIG. 3 is an isometric view of a die that may be included in the spark plasma sintering apparatus shown in FIG. 2 and utilized to produce an annular sintered blank, which may then undergo further processing to produce the inner or outer race of a rolling element bearing in accordance with an exemplary embodiment of the method illustrated in FIG. 1.

The near net shape of the sintered blank and, therefore, the interior geometry of die 22 will vary in conjunction with the particular type of bearing component produced utilizing method 10. For example, in embodiments wherein manufacturing method 10 is utilized to produce a bushing, the sintered blank may be desirably produced to have an elongated cylindrical shape. Alternatively, in embodiments wherein method 10 is used to produce the ring or race of a rolling element bearing, the sintered blank may be fabricated to have an annular shape. In the latter regard, FIG. 3 is an isometric view of die 22 in an embodiment wherein method 10 is utilized to produce a sintered blank having a near net ring shape. As can be seen, die 22 includes an annular sidewall 46 and an inner cylinder 48. Cylinder 48 may be affixed to lower punch 40 of SPS apparatus 20 shown in FIG. 2. An annular piece 50 is conformally received in the annulus bound by sidewall 46 and inner cylinder 48. Annular piece 50 can be attached to upper punch 32 shown in FIG. 2 and converges toward the bottom of cylinder 48 to compress power mixture 44 contained within die 22 and yield the sintered blank in the previously-described manner.

After performance of the SPS process and production of the sintered blank, the sintered blank is next machined to impart the high temperature bearing component with its final desired shape (STEP 16, FIG. 1). When utilized to produce the race of a rolling element bearing, the inner and/outer circumferential surface of the sintered blank may be ground to impart the blank with a desired surface finish and/or actual dimensions (e.g., inner and outer diameters) in close conformance with the desired design dimensions. Additional processing steps may then be performed to complete fabrication of the high temperature bearing element (STEP 18, FIG. 1). Such additional processing can include, for example, the application of a coating or coating system. Further, in certain embodiments, a precipitate hardening process may be performed. By way of example, the precipitate heating process may entail a solution heat treat performed at a first temperature range (e.g., 2100±100° F. or 1148±37° C.) for a first time period, a room temperature cooling period, an aging heat treatment process performed at a second temperature range (e.g., 1600±100° F. or 871±37° C.) for a second time period (e.g., 16 hours), and then a cold bath quench. In further embodiments, precipitate hardening can be performed prior to final machining. This concludes method 10 (FIG. 1).

Figure 4:
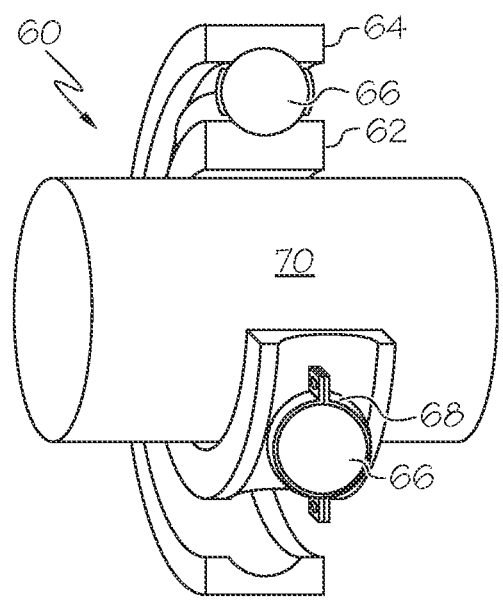
FIG. 4 is an isometric cutaway view of a high temperature rolling element bearing including inner and outer races, either or both of which may be produced utilized the exemplary manufacturing method of FIG. 1.

After production, the high temperature bearing component may then be assembled into a high temperature bearing. FIG. 4 is an isometric cutaway view of a high temperature rolling element bearing 60 including an inner ring or race 62 and an outer ring or race 64, which is concentric with race 62. Either or both of inner race 62 and outer race 64 can be fabricated utilizing manufacturing method 10, as described above in conjunction with FIGS. 1-3. In this particular example, rolling element bearing 60 is a ball bearing that further includes a number of balls 66 retained by a cage or separator 68. In further embodiments, however, rolling element bearing 60 can be a different type of rolling element bearing, such as a roller, tapered roller, needle, or combination bearing. Rolling element bearing 60 is disposed around a shaft 70, which may be fabricated from a superalloy. As noted above, inner race 62 can be produced from a superalloy powder similar or identical to the superalloy of shaft 70, but further containing hard wear (e.g., TiC) particles. In this manner, the CTE of inner race 62 can be closely matched to that of shaft 70 to favorably reduce radial loading as shaft 70 expands during high temperature operation. Rolling element bearing 60 is well-suited for usage in automotive, avionic, and other turbomachine applications in view of its desirable high temperature properties, particularly its enhanced hot hardness properties. As a first specific example, rolling element bearing 60 can be usefully employed to support the shaft of a valve within a gas turbine engine deployed onboard an aircraft and utilized to regulate the flow of hot, compressed bleed air. As a second specific example, rolling element bearing 60 can be utilized to support the spinning shaft of a turbocharger. These examples notwithstanding, it is emphasized that the rolling element bearings and the high temperature bearing components produced utilizing method 10 (FIG. 1) are not limited to any particular application or usage.

The foregoing has thus provided embodiments of a method for manufacturing bearing components having enhanced hardness, fatigue resistance, wear resistance, toughness (fracture resistance), and strength properties at highly elevated operating temperatures exceeding 1200° F. (~648° C.) and, in certain cases, operating temperatures approaching or exceeding 1400° F. (~760° C.). As described above, the bearing components are produced from a powder mixture, which is consolidated into sintered blank having a near net shape utilizing a SPS process. The powder mixture contains a superalloy powder admixed with hard wear particles, such as titanium carbide or other ceramic particles. In contrast to other powder sintering processes, such as liquid phase sintering processes, the SPS process can be performed at lower temperatures and in abbreviated time periods. This not only increases manufacturing efficiency, but allows the production of sintered blanks having exceptionally high densities and highly refined microstructure. After SPS, the sintered blank can be ground or otherwise machined to impart the bearing component with its final shape. Precipitate hardening may also be performed after final machining, if desired. The end result is a high temperature bearing component having relatively high hardness levels (e.g., Rockwell hardnesses of C50 or greater) and other desirable physical properties even when subjected to highly elevated operating temperatures unsuitable for conventional bearing components.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for producing a high temperature bearing component, the method comprising:
    obtaining a powder mixture containing a nickel-based superalloy powder admixed with hard wear particles and substantially free of iron;
    consolidating the powder mixture utilizing a Spark Plasma Sintering (SPS) process during which the powder mixture is compressed into a sintered blank having a near net shape, while an electrical current is conducted through the powder mixture to heat the powder mixture to a sintering temperature; and
    machining the sintered blank to yield a final shape of the high temperature bearing component.

2. The method of claim 1 wherein the high temperature bearing component comprises an inner race of a rolling element bearing, and wherein the powder mixture is compressed into a near net ring shape during the SPS process.

3. The method of claim 2 further comprising:
    sizing the inner race for installation around a shaft produced from a superalloy having a first coefficient of thermal expansion (CTE); and
    selecting the superalloy powder to have a second CTE matched to the first CTE.

4. The method of claim 1 wherein obtaining comprises selecting the nickel-based superalloy powder to comprise a gas atomized, nickel-based superalloy powder admixed with the hard wear particles.

5. The method of claim 1 wherein obtaining comprises selecting the nickel-based superalloy powder to contain superalloy powder particles having a first maximum diameter admixed with hard wear particles having a second maximum diameter greater than the first maximum diameter.

6. The method of claim 1 wherein obtaining comprises selecting the nickel-based superalloy powder to consist essentially of the superalloy powder admixed the hard wear particles.

7. The method of claim 1 further comprising selecting the powder mixture to contain 10 to 55 percent hard wear particles, by volume.

8. The method of claim 1 wherein obtaining comprises selecting the powder mixture to contain 25 to 30 percent titanium carbide particles, by weight.

9. The method of claim 1 further comprising selecting the hard wear particles from the group consisting of carbide, nitride, boride, silicide, and oxide particles.

10. The method of claim 1 further comprising, after machining, precipitate hardening the high temperature bearing component.

11. The method of claim 1 wherein the SPS process is performed under process conditions imparting the sintered blank with less than 1% porosity, by volume.

12. A method for producing a high temperature bearing component, the method comprising:
    obtaining a powder mixture containing a gas atomized, nickel-based superalloy powder admixed with ceramic particles, the powder mixture further containing tungsten and cobalt, while being substantially free of iron;
    passing an electrical current through the powder mixture to heat the powder mixture to a sintering temperature, while compressing the powder mixture into an annular sintered blank;
    machining the annular sintered blank to impart the high temperature bearing component with a final shape; and
    precipitate hardening the high temperature bearing component to increase the hardness of the high temperature bearing component at elevated operating temperatures.

13. The method of claim 12 wherein the annular sintered blank is machined to impart the high temperature bearing component with the final shape of a bearing race.

14. The method of claim 12 further comprising selecting the powder mixture to contain 20 to 35 percent titanium carbide particles, by weight.

15. A high temperature rolling element bearing, comprising:
    an inner ring;
    an outer ring concentric with the inner ring; and
    a plurality of rolling elements captured between the inner ring and the outer ring;
    wherein at least one of the inner ring and the outer ring is composed a powder mixture consolidated into a coherent mass utilizing a spark plasma sintering process carried-out under process conditions creating a superalloy matrix substantially free of intermetallic phases, containing less than 1% porosity by volume, and throughout which hard wear particles are distributed.

16. The high temperature rolling element bearing of claim 15 wherein the superalloy matrix comprises a nickel-based superalloy, and wherein the hard wear particles comprise ceramic particles.

17. The high temperature rolling element bearing of claim 16 wherein the ceramic particles have a mean diameter between 5 and 15 microns.

18. The high temperature rolling element bearing of claim 15 wherein the powder mixture, as consolidated into the coherent mass, contains 25 to 30 percent titanium carbide particles by weight.

19. The high temperature rolling element bearing of claim 15 wherein the superalloy matrix is substantially free of iron.

20. The high temperature rolling element bearing of claim 15 wherein the hard wear particles are selected from the group consisting of carbide, nitride, boride, silicide, and oxide particles.

* * * * *